United States Patent [19]

Yokoyama

[11] Patent Number: 4,474,528

[45] Date of Patent: Oct. 2, 1984

[54] WATER WHEEL OPERATION CONTROL METHOD AND APPARATUS THEREFOR

[75] Inventor: Toshiaki Yokoyama, Hitachi, Japan

[73] Assignee: Hitachi, Ltd., Tokyo, Japan

[21] Appl. No.: 221,814

[22] Filed: Dec. 31, 1980

[30] Foreign Application Priority Data

Jan. 7, 1980 [JP] Japan .................................... 55-117
Apr. 11, 1980 [JP] Japan ................................ 55-46896

[51] Int. Cl.³ ............................................ F01D 21/14
[52] U.S. Cl. ......................................... 415/1; 415/26; 415/500
[58] Field of Search ............. 415/1, 20, 26, 17, 213 C, 415/14, 500

[56] References Cited

U.S. PATENT DOCUMENTS

| | | | |
|---|---|---|---|
| 3,339,567 | 9/1967 | Fukasu | 415/1 |
| 3,658,436 | 4/1972 | Oishi | 415/1 |
| 3,886,373 | 5/1975 | Okada | 415/1 |
| 4,280,788 | 7/1981 | Tsunoda | 415/1 |

FOREIGN PATENT DOCUMENTS 122036 10/1978 Japan .................................. 415/20

Primary Examiner—Philip R. Coe
Assistant Examiner—Frankie L. Stinson
Attorney, Agent, or Firm—Beall Law Offices

[57] ABSTRACT

Methods of controlling operation of power generating water wheels and apparatus therefor are disclosed. When a guide vane will not close upon occurence of a state of emergency, the inlet valve is kept open until the flow to the wheel starts to suddenly decrease, and then the valve is closed to cut off the flow. The above operation control can be applied to each of a plurality of water wheels forming at least one closed loop water channel. For simultaneous cutoff of the plurality of water wheels, when one guide vane has been closed but other guide vanes will not close, or when guide vanes are closed with a time lag the inlet valves of the plurality of water wheels are closed to cut off the flow, thereby preventing mutual interference among the water wheels to eliminate generation of abnormal water pressure in the closed loop water channel.

21 Claims, 20 Drawing Figures

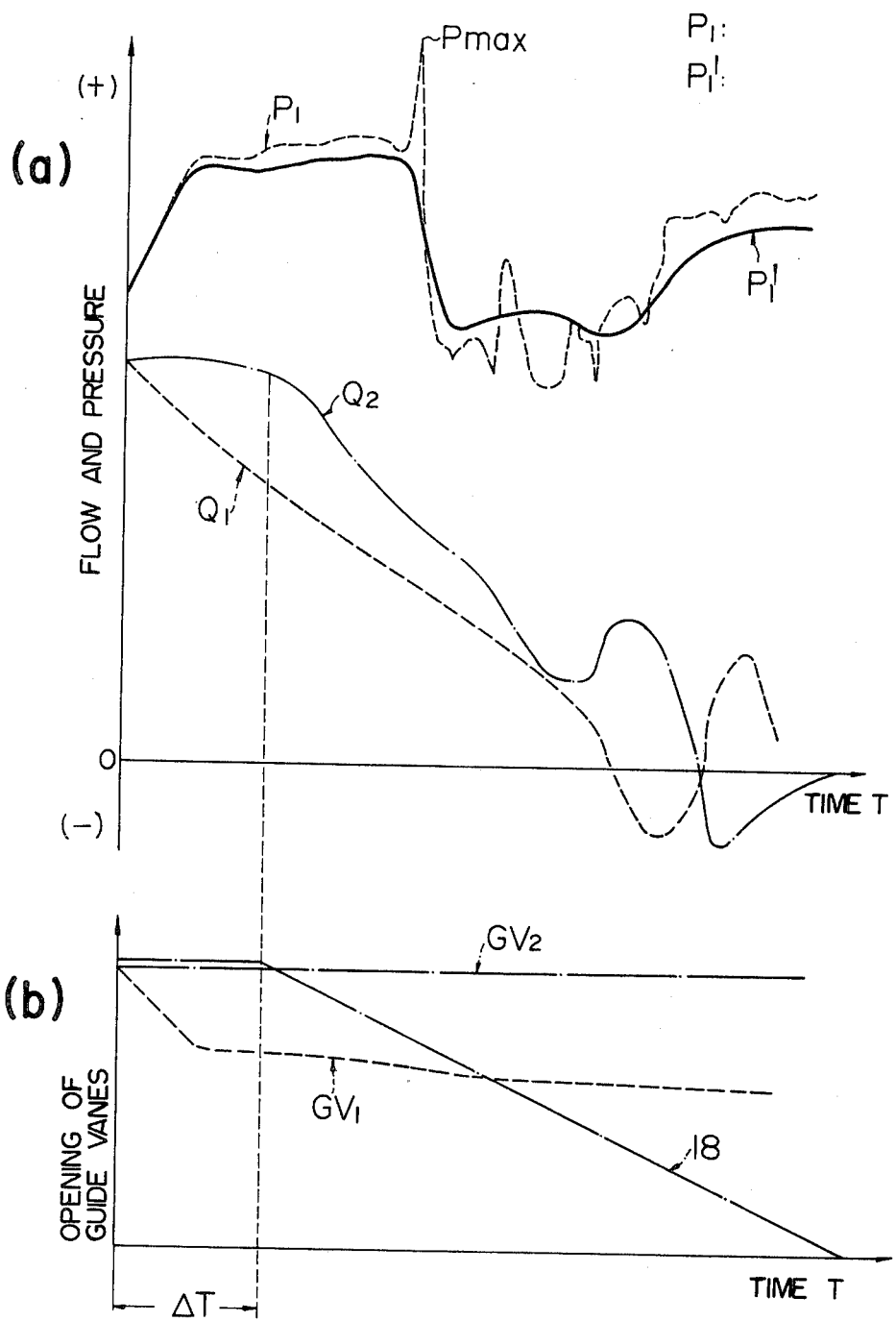

WATER WHEEL OPERATION CONTROL METHOD AND APPARATUS THEREFOR

BACKGROUND OF THE INVENTION

This invention relates to a water wheel operation control method and an apparatus therefor, and particularly to a water wheel operation control method and an apparatus therefor in which when a state of emergency occurs during a power generating operation and a guide vane will not close, the inlet valve is maintained substantially open to a certain degree for a predetermined time period without immediately being closed, thereby preventing the abnormal increase or decrease of water pressure and so on caused upon cut-off of flow.

In this specification, the term "a water wheel" includes not only a water wheel or water turbine but also a reversible pump turbine.

Such a state of emergency can be caused for example by, lightening strokes, abnormal operating conditions of a water wheel and so on. When such a state of emergency occurs, it is necessary to immediately electrically disconnect the load connected to the water wheel. Besides, the operation of the water wheel will have to be stopped in case of the abnormal conditions of the water wheel per se. When the operation of a water wheel is stopped, the guide vane of the water wheel is usually automatically closed. In the case where the guide vane is not closed for some reason such as a failure of a guide vane driver of the water wheel, however, the inlet valve for the wheel is closed. In this case, when the inlet valve is being closed, or in the transient state in which the flow is being cut off, an abnormal water pressure is caused in the water channel or waterway, and this may lead to breakdown of the water wheel or water channel.

In the case of operating a plurality of water wheels which are connected in parallel between the common upper pond or surge-tank and the common lower pond to form a closed loop of waterway therebetween, when, for example, two of the plurality of water wheels have to be simultaneously disconnected from a power system, and when the guide vanes thereof are closed at different times or one of the guide vanes is closed but the other is not closed, the two water wheels may interfere with each other, causing an abnormal water pressure by which the water wheels, or water channels, or waterways may be damaged.

SUMMARY OF THE INVENTION

The present invention is intended to prevent generation of an abnormal water pressure in a transient state in which a water flow is being cut off to thereby smoothly stop a water wheel.

It is an object of the invention to provide a water wheel operation control method and an apparatus therefor for preventing an abnormal change in the water pressure (an abnormal increase or decrease) by properly arranging the flow characteristics of the guide vanes and inlet valves of the water wheels.

In accordance with the invention, there is provided a water wheel operation control method and an apparatus therefor in which when the guide vane is not closed upon an emergency, the inlet valve is kept substantially open until the flow to the water wheel starts to suddenly decrease, and thereafter the inlet valve is closed to cut off the flow.

BRIEF DESCRIPTION OF THE DRAWINGS

FIG. 9 is characteristic curves in the case where the present invention is used in the arrangement of FIG. 6.

DESCRIPTION OF THE PREFERRED EMBODIMENTS

Prior to the detailed description of the preferred embodiments of the invention, the necessity of this invention will generally be described for the better understanding of the invention.

The higher the head is, the larger the rotational speed of a water wheel is and the greater the centrifugal action of the runner thereof is.

Figure 1:
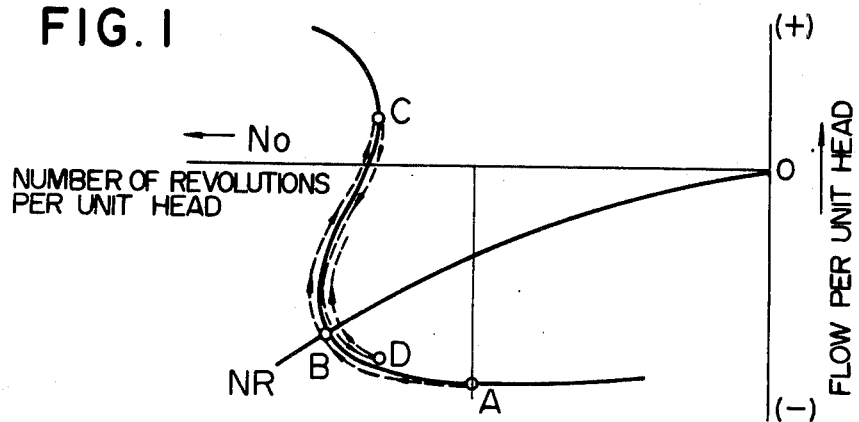
FIG. 1 is a graph of the relation between the rotational speed of a water wheel and the flow thereto and a characteristic curve of the runaway speed.

FIG. 1 shows a rotational speed vs. flow curve of a high-head water wheel in the case where the water wheel is electrically disconnected from the power system upon the occurence of a state of emergency under such a condition that both the guide vane of the water wheel and the inlet valve for the water wheel are left open. In FIG. 1, $N_0$ represents the number of revolutions per unit head and $Q_0$ the amount of flow per unit head. If the head is represented by H, the actual number of revolutions by N and the actual amount of flow by Q, the values of $N_0$ and $Q_0$ are given by $$N_0 = N/\sqrt{H},$$

$Q_0 = Q/\sqrt{H}$.

The polarity of the amount of flow per unit head $Q_0$ is plus + for a pump mode and minus − for a water wheel mode. From FIG. 1, it will be seen that when the rotational speed has risen from the value corresponding to the point A which is under the power generating operation or water wheel mode and past the value corresponding to the point B on the runaway speed NR, the flow curve is suddenly pressed to trace a hysteresis path as indicated by A→B→C→D.

A higher-head water wheel requires a longer water pressure iron tube and is supplied with high-flow-speed water. On the other hand, a higher speed water wheel is provided with a dynamotor having a small inertia rotor. In other words, the water wheel has a feature that the flow therein is rapidly restricted so that the inertia of the rotor becomes smaller and the inertia of the water path becomes larger to have the greater effect on the water wheel.

Figure 2:
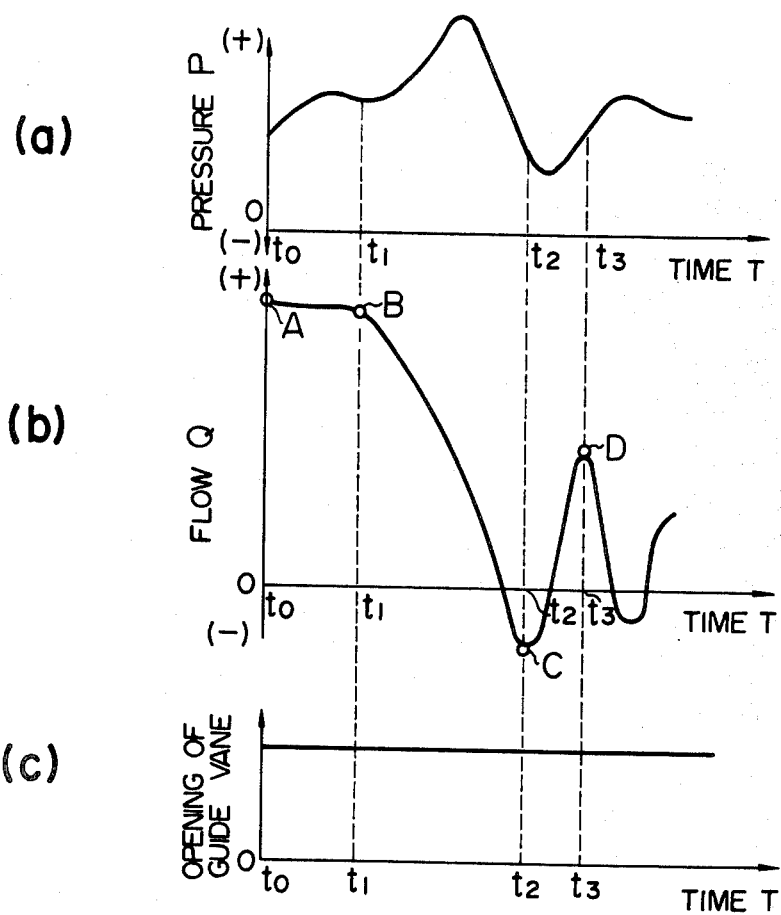
FIG. 2 is graphs showing changes in the water pressure, the flow and the guide vane opening, with respect to time from the time point at which an instruction to disconnect the load has been issued, in the case where the guide vane is not closed and the inlet valve is kept open to a certain degree.

In FIG. 2, the graphs (a) and (b) show the changes with time in the water pressure P and in the flow Q respectively in the iron tube (direct tube portion of the casing) and the graph (c) shows the state of the guide vane of the water wheel which can not be closed for some reason, under the condition that a state of emergency occurs during operation of power generation and therefore the water wheel is disconnected from the power system. In FIG. 2, the water pressure P and the flow Q both take plus sign for the water wheel mode and minus sign for the pump mode, and the abscissa indicates the common time lapse T after the water wheel is disconnected from the power source (namely after the load is cut off).

In FIG. 2, the changes in the water pressure P and in the flow Q correspond to the change of state shown in FIG. 1, and the points A, B, C and D on the curve in the graph (b) of FIG. 2 correspond to the points A, B, C and D on the rotational speed vs. flow curve of FIG. 1.

As shown in FIG. 2, the flow in the water wheel is, as seen from FIG. 2(b), suddenly changed for the above reasons, from state A (time $t_0$) to state B (time $t_1$), from state B to state C (time $t_2$), and from state C to state D (time $t_3$), and also the water pressure therein is abnormal as seen from FIG. 2(a). In this case, both the flow and the water pressure change a little until a certain time elapses from time $t_0$ at which the load is cut-off, or until time $t_1$, but the flow suddenly changes in the range from $t_1$ to $t_2$ since the flow is restricted in that range, and hence the water pressure is also abnormally increased depending thereon. That is, due to the fluid restriction action after the runaway speed NR as described above, the water pressure and the flow change in an abnormal manner. In this case, the inlet valve can not be closed as shown in FIG. 2(c).

Figure 3:
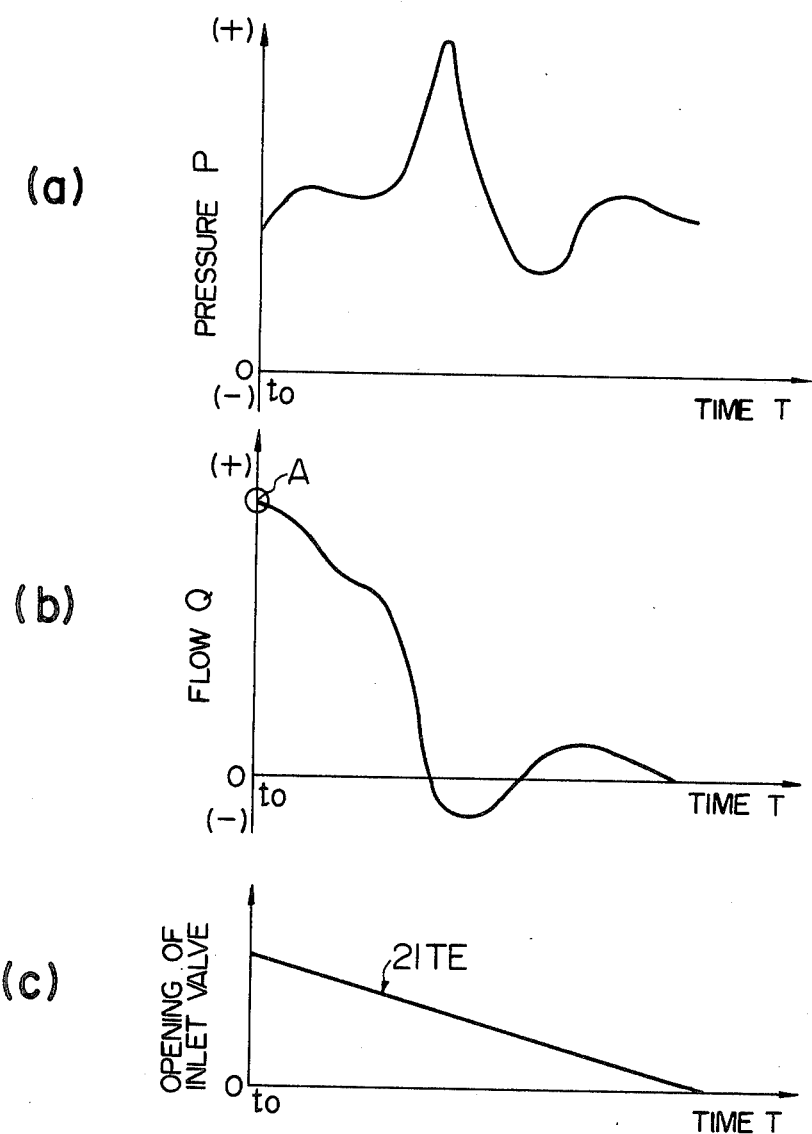
FIG. 3 is graphs showing changes in the water pressure, the flow, and the guide vane opening, with respect to time from the time point at which an instruction to disconnect the load is issued, in the case where the guide vane is not closed and the inlet valve is instantly closed in an emergency flow cut-off mode.

FIG. 3 shows changes in the pressure (FIG. 3(a)), in the flow (FIG. 3(b)), and in the opening of the inlet valve (FIG. 3(c)), under the condition that in order to prevent such a rapid change in flow as shown in FIG. 2, the emergent flow cut-off in which the inlet valve is closed at a relatively high speed is performed (hereinafter, referred to as the step 21TE). In FIG. 3, the positive and negative directions of the water pressure and the flow are selected similar to those of FIG. 2.

From FIG. 3, it will be understood that since the inlet valve starts to close at the instant of the load cutoff A (time $t_0$), a relatively gentle decrease of the flow due to the water wheel as seen between the points A and B in FIGS. 1 and 2 may be accelerated to a rapid decrease of flow by the flow restriction action of the inlet valve. Thus, not only the object to be expected is not achieved satisfactorily but also the water pressure P in the iron tube is conversely raised to a more abnormal value than that in FIG. 2.

The aforesaid step 21TE, as shown in the change in the opening of the inlet valve in FIG. 3(c), is such an operation that the inlet valve is closed at a relatively high valve-closing speed (for example, the inlet is completely closed from the full opening in 10 seconds). Even if the valve is slowly closed at a low speed (hereinafter, referred to as the step 21T) instead of the step 21TE, the valve starts to close at the instant of the cutoff of load, and thus this low speed closing of valve cannot always prevent the rapid change in the flow and the abnormal increase of the water pressure as shown in the change of state through the points b, C and D in FIGS. 1 and 2.

A preferred embodiment of the invention will be described with reference to FIGS. 4 and 5.

Figure 4:
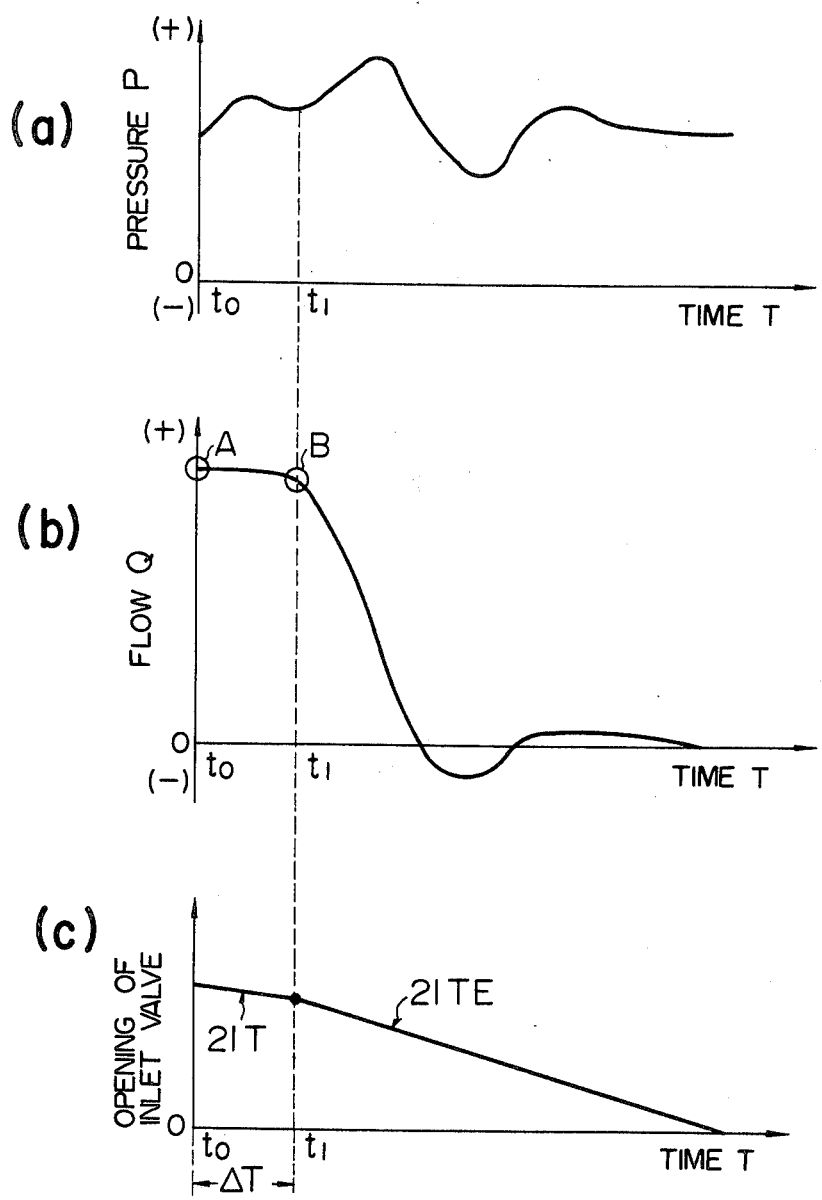
FIG. 4 is graphs showing changes in the water pressure, the flow, and the guide vane opening, with respect to time from the time point at which an instruction to disconnect load, in the case where the guide vane is not closed and the inlet valve is kept substantially open for a certain time according to the invention and then the inlet valve is closed in the emergency flow cut-off mode.

FIG. 4 show the changes in the water pressure P (FIG. 4(a)), in the flow Q (FIG. 4(b)), and in the degree of opening of the inlet valve (FIG. 4(c)), with respect to time T in such a case as is described below: A state of emergency can be caused for example by a stroke of lightening, or a failure of the guide vane driving section occur during the power generating operation of the water wheel and the guide vane can not be closed. In this case the state of emergency is detected and at the same time the water wheel is disconnected from the power system at the point A (time $t_0$ at which the load is cut off), then the inlet valve closing operation being carried out for a certain time $\Delta T$ from time $t_0$ to time $t_1$ (for example, 2 seconds) in accordance with the step 21T and after the point B (time $t_1$) or the nearby point where a sudden pressing action starts occuring on the flow in the water wheel the emergent flow cut-off operation being performed in accordance with the step 21TE. Also in this case, the positive and negative directions of the water pressure P, and the flow Q are selected similarly to those of FIG. 2.

As will be seen in FIG. 4, the water pressure P (FIG. 4(a)) and the flow Q (FIG. 4(b)) change smoothly with no abnormal rise and fall of water pressure unlike those of FIGS. 2 and 3.

Figure 5:
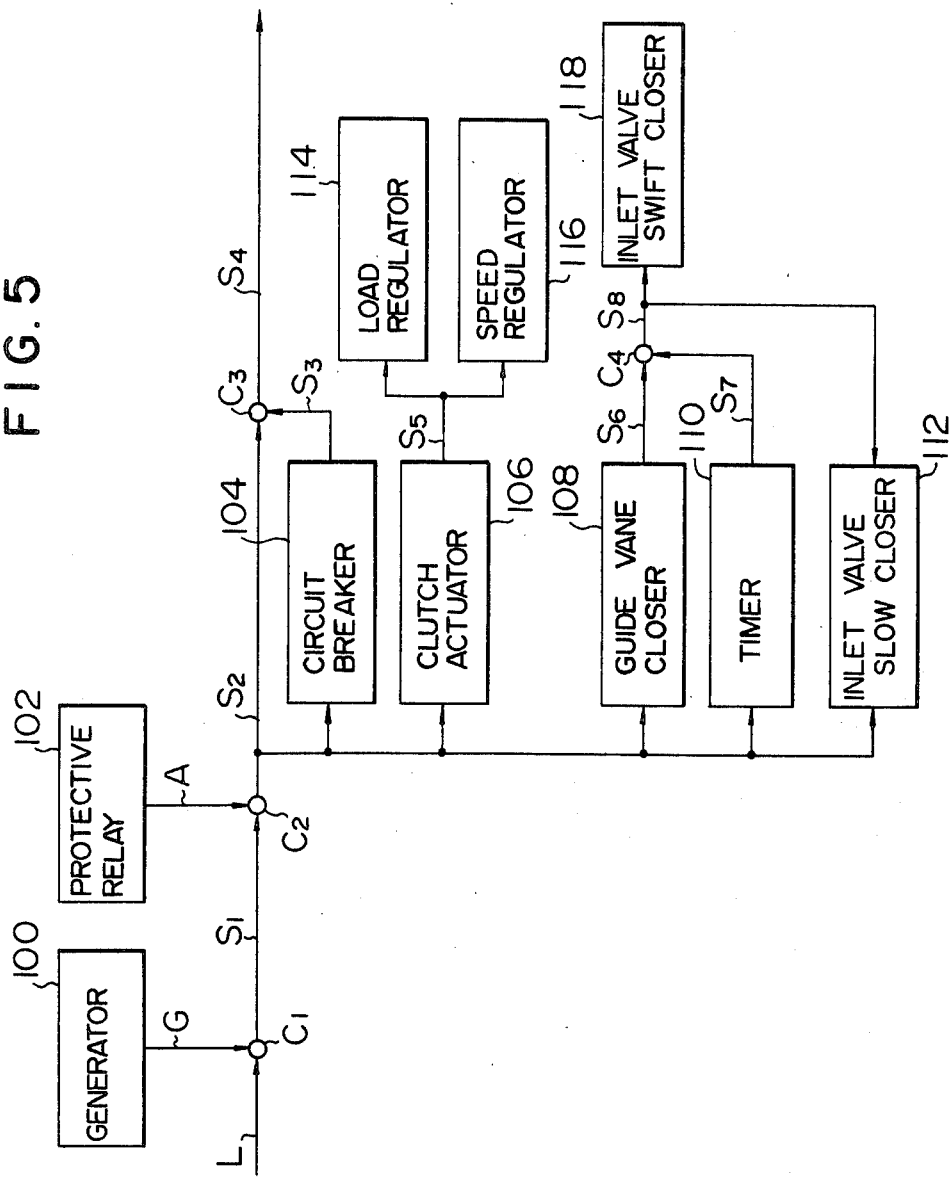
FIG. 5 is a block diagram showing the arrangement of devices and the flow of control signals, for implementing the water wheel operation control method of the invention.

FIG. 5 is a block diagram sequentially showing the flow of control signals for implementing the method of operating the water wheel according to the invention presented in FIG. 4.

Referring to FIG. 5, there is shown a water wheel generator 100 which produces a signal G during its power generating operation. The signal G is applied to a comparator $C_1$ where it is compared with a signal L which shows that the power system is operating, resulting in the production of a signal $S_1$. This signal $S_1$ from the comparator $C_1$ is applied to a comparator $C_2$. When a protective relay 102 for monitoring the state of the power system detects abnormality in the power system, the relay 102 produces a signal A instructing to stop the operation of the water wheel. This signal A is compared with the signal $S_1$ at the comparator $C_2$, which then produces a command signal $S_2$ instructing to electrically disconnect the water wheel generator 100 from the power system and in case there is a reason to stop the wheel to mechanically stop the wheel. The signal $S_2$ is applied to a circuit breaker 104, a clutch actuating electromagnetic device 106, a water wheel guide vane closing device 108, a timer 110 and an inlet-valve slow closing device 112, all of which are known. The circuit breaker 104 is responsive to the signal $S_2$ to disconnect the generator 100 from the power system, in which case the disconnection is completed for example, in 0.25 second from the reception of signal $S_2$. When finishing the disconnection, the circuit breaker 104 produces a signal $S_3$ indicating the completion of disconnection. This signal $S_3$ is applied to a comparator $C_3$ where it is compared with the signal $S_2$. The comparator $C_3$ produces a signal $S_4$ as long as the signal $S_2$ is present. This signal $S_4$ is continued until the water wheel is completely stopped, and as known well it serves to cause the exciting circuit of the generator 100 to open and the load regulating motor to cut off, although having no direct relation with the invention.

The clutch actuating electromagnetic device 106 responds to the signal $S_2$ to be energized to turn off the clutch of the water wheel, thereby producing a signal $S_5$ showing this clutch-off condition. This signal $S_5$ is applied to a load regulating device 114 and a speed regulating device 116, turning off the devices 114 and 116. When turning on, the devices 114 and 116 perform load regulation and speed regulation of the water wheel, respectively. These devices 114 and 116, which are known and of which operation is out of the scope of the invention, thus will not be described in detail.

The guide vane closing device 108 is responsive to the signal $S_2$ to close the guide vane, and then produces a signal $S_6$. The timer 110 starts counting time from the time point when the signal $S_2$ is received, and produces a signal $S_7$ when a predetermined time $\Delta T$ (for example, 2 seconds) elapses from the reception of the signal $S_2$. The signal $S_7$ is compared with the signal $S_6$ at a comparator $C_4$, which produces a signal $S_8$ telling that the guide vane is not closed when the signal $S_6$ is absent under the application of the signal $S_7$ to the comparator $C_4$, namely when the guide vane does not start closing after the lapse of $\Delta T$. An inlet-valve swift closing device 118 is responsive to the signal $S_8$ to rapidly close the inlet valve provided at the inlet side of the water wheel (in accordance with the step 21TE in FIG. 4(c)).

On the other hand, the inlet-valve slow closing device 112 is responsive to the signal $S_2$ to start slowly closing the inlet valve (in accordance with the step 21T in FIG. 4(c)). The signal $S_8$, when generated, is applied to the inlet valve slow closing device 112, causing the step 21T by the inlet valve slowly closing device to be switched to the step 21TE by the inlet valve swiftly closing device 118.

The time $\Delta T$ at which the timer 110 is set corresponds to the region of the gentle fluid restriction action by the water wheel itself (the region between the points A and B in FIG. 2).

The embodiment of FIG. 5 shows the case where the inlet valve is slowly closed in accordance with the step 21T after detection of a state of emergency, and after the lapse of a certain time $\Delta T$, the valve is swiftly closed in accordance with the step 21TE for the emergency cut-off of the water flow; i.e., the combination of slow and swift cutting-off operations is used to close the inlet valve. However, this gentle cut-off 21T of the water flow may be omitted, provided that the inlet valve is maintained open for a certain time $\Delta T$ (for example, 2 seconds) and after the lapse of $\Delta T$, only the rapid cutoff 21TE of water flow is performed to close the inlet valve, with substantially the same effect.

The feature of this invention is, therefore, that the inlet valve is maintained substantially open for a certain time $\Delta T$. This means that it is sufficient for the purpose of the application if the inlet valve is only open to a considerable degree after the time $\Delta T$ has elapsed. Therefore, as long as the inlet valve is slowly closed, it is possible to cause the valve to be gradually closed during the time $\Delta T$. In other words, in accordance with the invention, the inlet valve is not only kept as it is at a degree of opening during the time $\Delta T$, but also may be slowly closed as shown in FIG. 4.

The present invention is not limited to the case in which a single water wheel is used, but may be applied to the case where a plurality of water wheels are provided which are operated in parallel and which have a waterway arrangement provided with a common water pressure iron tube and/or water discharge tube.

Figure 6:
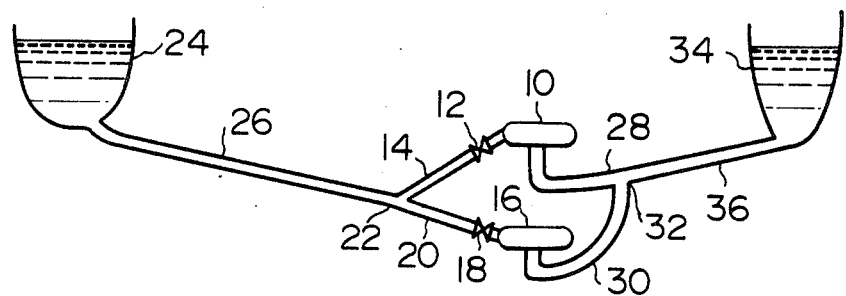
FIG. 6 is a schematic diagram of an example of the arrangement of two water wheels forming a closed loop of water channel.

In a hydraulic power station, a portion of the water channel is sometimes used commonly for lowering cost of earthworks. FIG. 6 shows an example thereof. A first water wheel 10 is connected through an inlet valve 12 and a water pressure iron tube 14 to a common branch point 22, while a second water wheel 16 is connected through an inlet valve 18 and a water pressure iron tube 20 to the common branch point 22. The common branch point 22 is connected through a common water pressure iron tube 26 to an upper pond or a surge-tank 24. In addition, the first and second water wheels 10 and 16 are connected through draft tubes 28 and 30, respectively, to a common branch point 32 which is in turn connected through a water discharge path 36 to a lower pond 34. In this case, a closed loop water channel is thus formed which includes the branch point 22, the water pressure iron tube 14, the inlet valve 12, the first water wheel 10, the draft tube 28, the branch point 32, the draft tube 30, the second water wheel 16, the inlet valve 18 and the water pressure tube 20 in this order. Although two water wheels are shown in FIG. 6 for simplicity, three or more water wheels may be operated in parallel.

Figure 8:
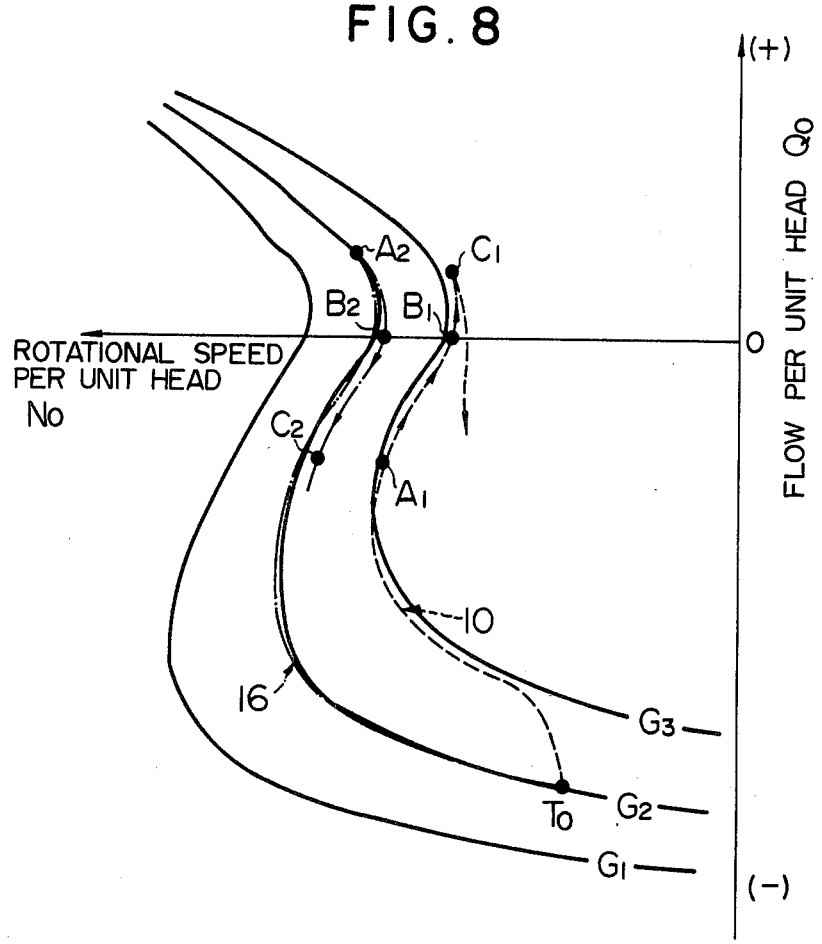
FIG. 8 shows a rotational speed vs. flow characteristic curve useful for explaining the reason why such abnormal changes occur in the flow as shown in FIG. 7.
Figure 7:
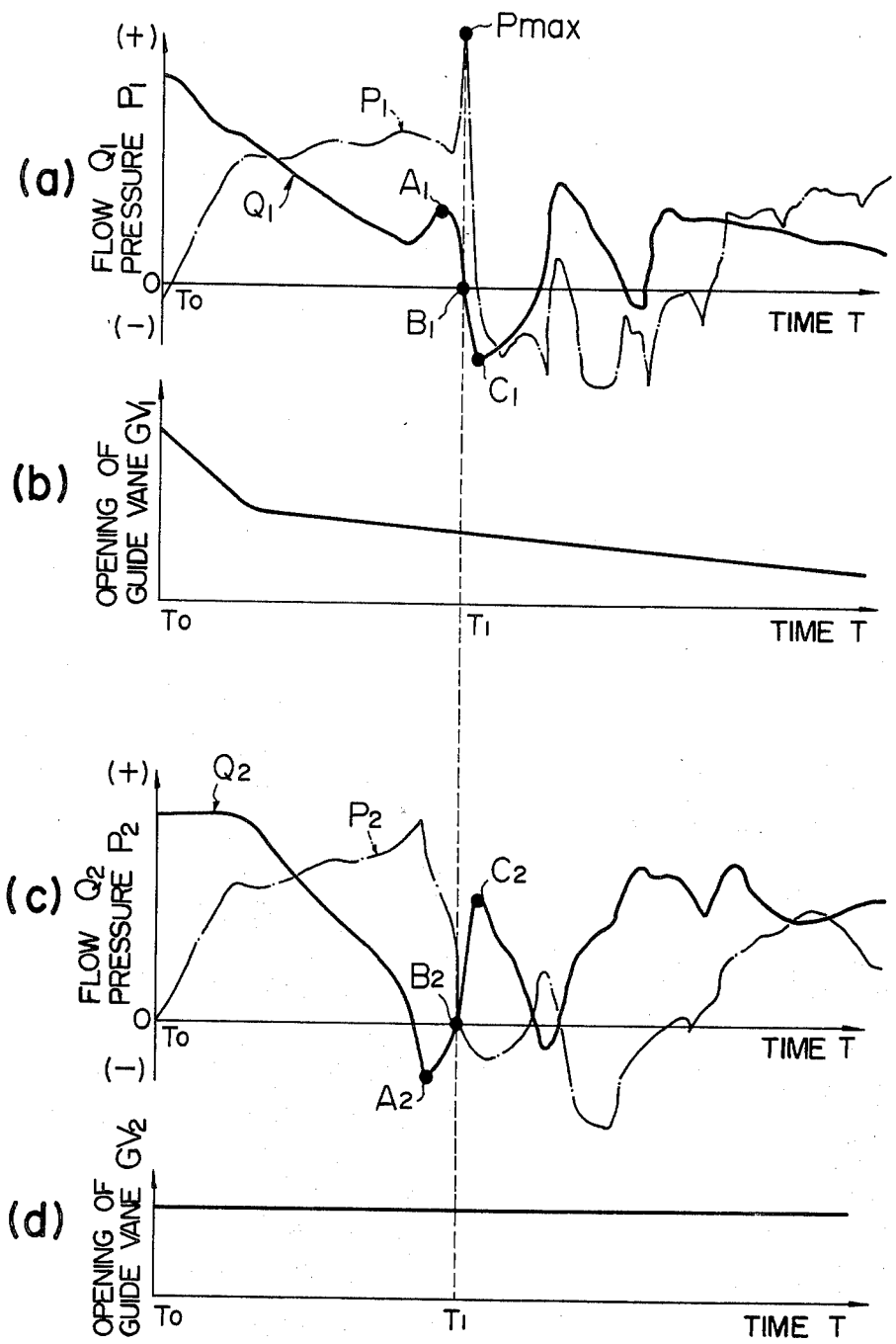
FIG. 7 shows curves useful for explaining the example in which two water wheels are stopped in an emergency and the guide vane of one of the water wheels is not closed, causing an abnormal water pressure rise.

In such a hydraulic power station, when two water wheels under a water wheel mode, or power generating operation are intended to be electrically disconnected from the power system, there is such a possibility that the wheels can not be disconnected at the same time with a time difference between the disconnection starting times at which the two wheels are disconnected from the power system resulting in a time lag in the closing operations of the respective guide vanes, or that either of the guide vanes will not be closed. At this time, the two water wheels interfere with each other to produce an abnormal phenomenon, which will be described later with reference to FIGS. 7 and 8. FIGS. 7(a) and 7(c) show the changes in the pressure $P_1$ and flow $Q_1$ of the first water wheel 10 and the changes in the pressure $P_2$ and flow $Q_2$ of the second water wheel 16, in the case when an attempt is made to disconnect the first and second water wheels 10 and 16 simultaneously. During the operation of FIG. 7(a), the guide vane $GV_1$ of the first water wheel 10 has been normally closed as shown in FIG. 7(b). During the operation of FIG. 7(c), on the other hand, the guide vane $GV_2$ of the second water wheel 16 has not been closed as shown in FIG. 7(d). In FIGS. 7(a) and 7(c), the directions of the flow and pressure take positive sign for the water wheel mode and negative sign for the pump mode. Specifically, when simultaneous electrical disconnection has been made at time $T_0$, the flow $Q_1$ in the first water wheel 10 suddenly changes around time $T_1$ from the wheel direction to the pump direction passing through the points $A_1 \rightarrow B_1 \rightarrow C_1$ as shown in FIG. 7(a). In the runner of a high head pump wheel, this change becomes steep due to the strong centrifugal action thereof. On the other hand, the flow $Q_2$ of the second water wheel 16 has changed suddenly around time $T_1$ from the pump direction to the wheel direction passing through the points $A_2 \rightarrow B_2 \rightarrow C_2$ as shown in FIG. 7(c). This phenomenon is caused by the different paths of both the water wheels 10 and 16 after disconnection, which will be understood from the relation between the rotational speed $N_0$ per unit head and the flow $Q_0$ per unit head as shown in FIG. 8. In FIG. 8, $G_1$, $G_2$ and $G_3$ show the rotational speed vs. flow characteristic curves for three different degrees at which the guide vane opens. FIG. 8 shows that although the opening degrees at which the guide vanes of the water wheels 10 and 16 open at time $T_0$ when a state of emergency is detected are $G_2$, the guide vane of the water wheel 10 is closed to $G_3$ on the basis of a guide vane closing command, but the guide vane of the water wheel 16 remains $G_2$ and will not further close. Therefore, the rotational speed vs. flow characteristic curves of the water wheels 10 and 16 follow different paths. The positive and negative directions of flow in FIG. 8 are the same as those of FIG. 1.

This mutual interference sometimes causes an abnormal water pressure phenomenon such as $P_{max}$ (abnormally high value of the water pressure in the iron tube) in FIG. 7. The mutual interference becomes severe causing abnormal phenomena frequently by the influence of the fact that:

1. The higher the head for the runner of a pump wheel is, the more the flow changes dive to the strong centrifugal action of the runner;
2. The shorter the paths between the branch portions 22 and 32 and the water wheels 10 and 16 respectively are, the smaller the inertia of the tube path is; and
3. The faster the rotational speed of the machine is, the smaller the inertia of the water path system is with respect to that of the rotor.

An example of the case where the flow is greatly changed by the mutual interference as shown in FIG. 8 will now be described. The flow $Q_1$ passing through the first water wheel 10 was $-15$ m$^3$/s at phenomenon $A_1$, and 12 m$^3$/s at $C_1$. The flow $Q_2$ passing through the second water wheel 16 was 7 m$^3$/s at phenomenon $A_2$ and $-23$ m$^3$/s at $C_2$. Here, the polarity of the flow was plus (+) sign for the pump operating direction and minus (−) sign for the water wheel operating direction.

In accordance with the invention, to remove the mutual interference, a similar method to the previously described control method is used to cut off the water flow through the inlet valve.

FIG. 9 shows various characteristics in the case wherein the present invention is applied to the water wheels which are parallelly operated with a closed loop water channel as shown in FIG. 6. From FIG. 9 it will be seen that when the guide vane GV$_2$ (not shown) of the second water wheel 16 has not been closed, the inlet valve 18 of the second water wheel 16 was closed after the lapse of, for example, time $\Delta T$ so as to cut off the water flow therethrough and so as to decrease the flowing-in and -out of water in the closed loop tube path thereby preventing the abnormal phenomenon from occurring. In FIG. 9(a), $Q_1$ and $Q_2$ are the flows respectively passing through the first and second water wheels and take plus sign for the wheel operation direction and minus sign for the pump operation direction. In addition, the curve $P_1$ shows the change in the water pressure of the first water wheel in the case when the operation control according to the invention is not performed, and which corresponds to the curve $P_1$ in FIG. 7(a), and the curve $P_1'$ shows the change in the water pressure of the first water wheel in the case when the operation control according to the invention is performed. From the curve $P_1'$, it will be seen that there is no abnormal water pressure $P_{max}$ which occurs in the prior art as seen in FIG. 7(a). In FIG. 9(a), the plus and minus directions of water pressure show the wheel operation and pump operation, respectively as in the flow.

Figure 10:
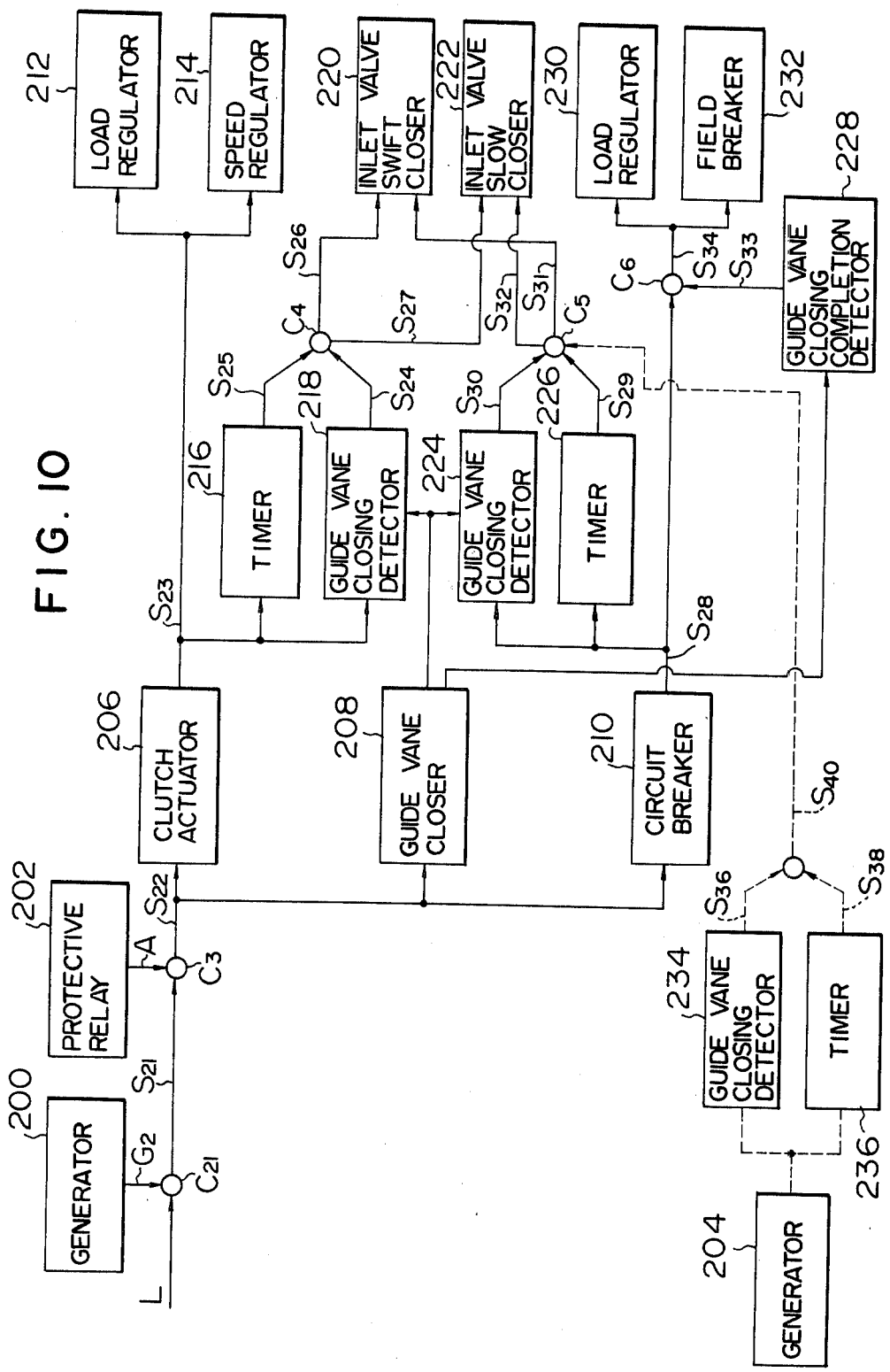
FIG. 10 is a block diagram of a specific embodiment for implementing the method of the invention in the arrangement of FIG. 6.

With reference to FIG. 10, a preferred embodiment of the invention will be described in which water wheels forming a closed loop water channel as shown in FIG. 6 are operated in parallel. FIG. 10 is a block diagram of the embodiment sequentially showing the flow of control signals for implementing the method of operating water wheels according to the invention. In FIG. 10, for simplicity, the operation control sequence for the second water wheel 16 is primarily shown and that for the first water wheel 10 is omitted since it is quite the same as that of the water wheel 16.

Referring to FIG. 10, a generator 200 connected to the second water wheel 16 produces a signal $G_2$ showing that the generator 200 is being operated. This signal $G_2$ is compared with a signal L showing the power system being operated, at a comparator $C_{21}$ which in turn produces a signal $S_{21}$. When an abnormal accident under which the operation of both the first and second water wheels 10 and 16 are to be stopped occurs and a protective relay 202 for the second generator 200 detects this accident, a signal A instructing to stop the operation of the first wheel 10 is produced from the relay 202. A protective relay (not shown) for a generator 204 connected to the first water wheel 10 also produces a similar signal which is not illustrated for the simplicity.

The signal A is compared with the signal $S_{21}$ at a comparator $C_3$ which in turn produces a signal $S_{22}$ when there is the signal $S_{21}$. The signal $S_{22}$ is applied to a clutch actuating electromagnetic device 206, a guide vane closing device 208 and a circuit breaker 210.

The clutch actuating electromagnetic device 26, when energized, turns the wheel clutch off and generates a signal $S_{23}$. The signal $S_{23}$ is applied to a load regulating device 212 and a speed regulating device 214 to turn them off which devices are similar to those described in the previous embodiment and the operation of which is out of the scope of the invention.

The signal $S_{23}$ is also applied to a timer 216 and a guide vane closing operation detecting device 218. The guide vane closing device 208 starts closing the guide vane the instant the signal $S_{22}$ is received thereby. The guide vane closing operation detecting device 218 produces a signal $S_{24}$ when it detects that the guide vane closing device 208 starts closing operation under the presense of signal $S_{23}$. On the other hand, the timer 216 starts counting time the instant it receives the signal $S_{23}$, and produces a signal $S_{25}$ when a predetermined time $\Delta T_1$ (for example, 2 seconds) has elapsed. The signals $S_{24}$ and $S_{25}$ are compared at a comparator $C_4$ which in turn produces a signal $S_{26}$ when only the signal $S_{25}$ is present, namely when the guide vane closing operation achieved by the guide vane closing device 208 is not detected yet after the predetermined time $\Delta T_1$ has passed since the signal $S_{23}$ was received by the timer 216. This signal $S_{26}$ is applied to an inlet valve swift closing device 220 which is responsive to the signal $S_{26}$ to close the inlet valve 18 at a relatively high speed in accordance with the step 2lTE as described in the above embodiment. An inlet valve slow closing device 222 is provided which, when actuated, slowly closes the inlet valve 18 at a normal speed. This device 222 is not necessarily required for the invention, but it is preferably used for more satisfactory maintenance of the water wheels. In this case, the signal $S_{24}$ does not simply show that the guide vane has started closing, but is needed to show the degree to which the guide vane is closed, by its amplitude for example. That is, if the timer 216 produces the signal $S_{25}$ but the guide vane closing operation detecting device 218 does not produce the signal $S_{24}$, the signal $S_{26}$ is produced because the guide vane is not closed at all. On the contrary, when the timer 216 produces the signal $S_{25}$ and the guide vane closing operation detecting device 218 produces the signal $S_{24}$ the amplitude of which is smaller than, for example, a certain value thus the guide vane being closed only to a too small degree, the signal $S_{27}$ is produced to thereby operate the inlet valve slow closing device 222.

The signal $S_{22}$ is also applied to the circuit breaker 210 to actuate it so that the generator 200 connected to the second water wheel 16 is electrically disconnected from the power system. Upon the completion of the cut-off operation, the circuit breaker 210 produces a signal $S_{28}$ which is applied to a guide vane closing operation detecting device 224 and a timer 226. This device 224 and the timer 226 operate in the same manner as did the previous device 218 and timer 216 except that the device 218 and timer 216 operates in response to the signal $S_{23}$ whereas the device 224 and timer 226 operate in response to the signal $S_{28}$. In other words, the timer 226 produces a signal $S_{29}$ after a predetermined time $\Delta T_2$ (which may be the same as $\Delta T_1$ or different as necessary) has elapsed from the reception of the signal $S_{28}$. On the other hand, the device 224 produces a signal $S_{30}$ when the guide vane starts closing. This signal $S_{30}$ is compared with the signal $S_{29}$ at the comparator $C_5$. When the signal $S_{29}$ is applied to the comparator $C_5$, if the signal is still absent at the comparator $C_5$, a signal $S_{31}$ is produced and supplied to the device 220 to actuate it so that the inlet valve 18 is swiftly closed to perform emergency cut-off of water flow. When the device 222 is provided, the signal $S_{32}$ is generated under quite the same condition as is the signal $S_{27}$ and this signal $S_{32}$ actuates the device 222 to slowly close the inlet valve 18.

A guide vane closing completion detecting device 228 is provided which produces a signal $S_{33}$ when detecting completely closing of the guide vane by the guide vane closing device 208. The signal $S_{33}$ is compared with the signal $S_{28}$ at a comparator $C_6$ so that when the signals $S_{28}$ and $S_{33}$ are both present, a signal $S_{34}$ is produced from the comparator $C_6$. This signal $S_{34}$ is transferred to a load regulating motor 230, and a field breaker 232 for the generator 200 which are known. This signal $S_{34}$ acts to actuate the motor 230 and to actuate the field breaker 232 to open the field circuit as is well known. These operations are out of the scope of the invention and thus will not be described in detail.

While the inlet valve slow closing device 222 is actuated by either of the signals $S_{27}$ and $S_{32}$ from the comparators $C_4$ and $C_5$ as described previously, this device 222 may be operated by the signal $S_{22}$ as is well known.

In this case, the instant the signal $S_{22}$ is generated, or when the guide vane starts to close by the guide vane closing device 208, the inlet valve 18 starts to close slowly and if, after a certain time $\Delta T_1$ or $\Delta T_2$ has elapsed, the device 220 is actuated, switching is made from the slow closing operation by the device 222 to the swift closing operation by the device 220.

A guide vane closing operation detecting device 234 and a timer 236 are provided which are used for the generator 204 connected to the first water wheel 10. This device 234 and the timer 236 correspond to the guide vane closing operation detecting device 224 and the timer 226 for the second water wheel, respectively and function in the same manner as do those devices. The device 234 and timer 236 produce signals $S_{36}$ and $S_{38}$, respectively, which are compared at a comparator $C_7$. When the signal $S_{38}$ is applied but the signal $S_{36}$ has not arrived thereat, a signal $S_{40}$ is produced therefrom. This signal $S_{40}$ corresponds to the signal $S_{31}$ previously mentioned. This signal $S_{40}$ is applied to the comparator $C_5$ where it is compared with the signal $S_{29}$. When the signal $S_{40}$ arrives thereat before the signal $S_{29}$ is produced, the comparator $C_5$ generates the signal $S_{31}$ or $S_{32}$ before the signal $S_{29}$ has arrived thereat. This means that the guide vane $GV_1$ of the first water wheel 10 and the guide vane $GV_2$ of the second water wheel 16 are closed at different times, or more specifically, the guide vane $GV_2$ is closed later than the guide vane $GV_1$. The signals $S_{31}$ and $S_{32}$ are selectively produced in accordance with the same way as described previously.

Description has been made above with respect to a preferred embodiment in which the guide vane of the second water wheel 16 is not closed in such an arrangement as shown in FIG. 6. However, the following cases may be accepted with the same effect:

1. In FIG. 6, a surge-tank is provided at the branch section 22 or 32;
2. In FIG. 6, three or more water wheels are provided; and
3. The cut-off point $T_0$ differs.

In accordance with the invention as described above, it is possible to control the operation of not only a single water wheel but also a plurality of water wheels forming a common closed loop water channel in which an abnormal phenomenon due to the mutual interference between the wheels can be prevented.

I claim:

1. A method of controlling a power generating water wheel in operation comprising the steps of:
   issuing an instruction to cut off a load from said water wheel upon occurrence of a state of emergency;
   cutting off the load from said water wheel in response to said instruction to cut off;
   issuing an instruction to close a guide vane of said water wheel in response to said instruction to cut off;
   monitoring the change in opening of the guide vane and generating a signal showing the closing operation when said guide vane closing operation is being performed;
   holding an inlet valve of the water wheel at a substantially opened state for a predetermined period from the issuing of said instruction to close a guide vane; and
   closing said inlet valve when no change in opening of said guide vane is detected after lapse of said predetermined period of time.

2. A method of controlling a power generating water wheel in operation according to claim 1, wherein said predetermined period of time corresponds to a time interval generally lapsed until the flow rate of the water wheel begins to rapidly decrease after cutting off the load.

3. A method of controlling a power generating water wheel in operation according to claim 2, wherein said inlet valve is maintained completely open for said predetermined period.

4. A method of controlling a power generating water wheel in operation according to claim 2, wherein said inlet valve is closed so slowly as not to exert a substantial influence on the water pressure of the water wheel, and after said predetermined time has elapsed, the inlet valve is closed at a relatively high speed.

5. A method of controlling a power generating water wheel in operation according to claim 1, wherein said predetermined period of time corresponds to a time interval generally lapsed during which the water pressure in the vicinity of the inlet valve first increases, then decreases, and starts to increase again in the vicinity of the end of said predetermined period of time.

6. A method of controlling a power generating water wheel in operation according to claim 5, wherein said inlet valve is maintained completely open for said predetermined period.

7. A method of controlling a power generating water wheel in operation according to claim 6, wherein said inlet valve is closed so slowly as not to exert a substantial influence on the water pressure of the water wheel, and after said predetermined time has elapsed, the inlet valve is closed at a relatively high speed.

8. A method of controlling water wheel operation in a hydraulic power generating system in which a plurality of water wheels for power generation are arranged to form a closed loop channel, said method comprising the steps of:
- issuing an instruction to stop the operation of each of said water wheels upon occurence of a state of emergency;
- electrically disconnecting each of said water wheels from a power system in response to said water wheel operation stop instruction;
- turning off a clutch of each of said water wheels in response to said water wheel operation stop instruction;
- issuing an instruction to close a guide vane of each of said water wheels in response to said water wheel operation stop instruction;
- monitoring the closing operation of said guide vane of each of the water wheels;
- issuing an instruction to close an inlet valve when it is not detected that said guide vane of each of said water wheels is being closed during a predetermined period after each of the water wheels is disconnected from a power system; and
- issuing an instruction to close said inlet valve of each of said water wheels when it is not detected that said guide vane of each of said water wheels is being closed during a predetermined period after a clutch of each of said water wheels is turned off.

9. A method of controlling water wheel operation according to claim 8, wherein when an instruction to close said inlet valve of one of said plurality of water wheels is issued faster than another instruction to close said inlet valve of another one of the water wheels, said inlet valve of said latter water wheel is closed by the instruction to close said inlet valve of said former water wheel.

10. A method of controlling a power generating water wheel in operation according to claim 8, wherein said predetermined period of time corresponds to a time interval generally lapsed until the flow rate of the water wheel begins to rapidly decrease after cutting off the load.

11. A method of controlling a power generating water wheel in operation according to claim 10, wherein said inlet valve is maintained completely open for said predetermined period.

12. A method of controlling a power generating water wheel in operation according to claim 10, wherein said inlet valve is closed so slowly as not to exert a substantial influence on the water pressure of the water wheel, and after said predetermined time has elapsed, the inlet valve is closed at a relatively high speed.

13. A method of controlling a power generating water wheel in operation according to claim 8, wherein said predetermined period of time corresponds to a time interval generally lapsed during which the water pressure in the vicinity of the inlet valve first increases, then decreases, and starts to increase again in the vicinity of the end of said predetermined period of time.

14. A method of controlling a power generating water wheel in operation according to claim 13, wherein said inlet valve is maintained completely open for said predetermined period.

15. A method of controlling a power generating water wheel in operation according to claim 13, wherein said inlet valve is closed so slowly as not to exert a substantial influence on the water pressure of the water wheel, and after said predetermined time has elapsed, the inlet valve is closed at a relatively high speed.

16. An operation control apparatus for a power generating water wheel operatively connected to a power system having a guide vane and an inlet valve, comprising:
- means for issuing a signal to stop the operation of said water wheel upon occurrence of a state of emergency;
- means for closing said guide vane in response to said water wheel operation stop signal;
- means for producing a first signal monitoring the closing operation of said guide vane and showing that said guide vane is being closed;
- means for counting time from the time when said water wheel operation stop signal is generated and producing a second signal after a predetermined time has elapsed;
- first inlet valve closing means closing said inlet valve to said water wheel at a first closing speed after said predetermined time when said first signal is not produced before said second signal is produced; and
- second inlet valve closing means which starts the closing operation of said inlet valve at a second closing speed slower than said first closing speed, in response to said water wheel operation stop signal.

17. An operation control apparatus according to claim 16, wherein said water wheel includes a circuit breaker for electrically disconnecting said water wheel from a power system, a clutch connecting said water wheel to the power system, and electomagnetic means for turning off said clutch of said water wheel.

18. An operation control apparatus for power generating water wheels comprising:
a plurality of water wheels operatively connected to a power system each having a guide vane and an inlet valve and arranged to form at least one closed loop water channel;
means for issuing an instruction to stop the operation of each of said water wheels upon occurrence of a state of emergency;
means for closing said guide vane of said water wheels in response to said water wheel operation stop instruction;
means for monitoring a closing operation of said guide vane of each of said water wheels;
means for electrically disconnecting each water wheel from said power system in response to said water wheel operation stop instruction;
means for turning off a clutch of each water wheel in response to said water wheel operation stop instruction;
first timer means which starts to count a first predetermined time in response to the completion of electrical disconnection of each water wheel by said electrical disconnecting means;
second timer means which starts to count a second predetermined time in response to the completion of turning off the clutch of each of said water wheels;
first inlet valve closing means for closing said inlet valve of each of said water wheels at a first closing speed when operated;
means for generating a first output signal instructing to operate said first input valve closing means after elapse of said first predetermined time and when it is not detected that said guide vane is being closed during said first predetermined time set in said first timer means, in response to said monitoring means and said first timer means for each of said water wheels; and
means for generating a second output signal instructing to operate said first inlet valve closing means after elapse of said first predetermined time and when it is not detected that said guide vane is being closed during said second predetermined time set in said second timer means, in response to said monitoring means and said second timer means for each of said water wheels.

19. An operation control means according to claim 18, wherein a selected one of said first and second output signals for one of said plurality of water wheels is used to instruct to operate said inlet valve closing means for each of the other water wheels.

20. An operation control apparatus according to claim 18, further comprising second inlet closing means for closing the inlet valve of each of said water wheels at a second closing speed slower than said first closing speed when operated, said second closing means being operated by said water wheel operation stop instruction.

21. A method of controlling a power generating water wheel in operation according to claim 19, further comprising second inlet closing means for closing the inlet valve of each of said water wheels at a second closing speed slower than said first closing speed when operated, said second closing means being operated by said water wheel operation stop instruction.

* * * * *